US011385399B1

(12) United States Patent
Bräysy et al.

(10) Patent No.: US 11,385,399 B1
(45) Date of Patent: Jul. 12, 2022

(54) INTEGRATED OPTICALLY FUNCTIONAL MULTILAYER STRUCTURE AND RELATED METHOD OF MANUFACTURE

(71) Applicant: TactoTek Oy, Oulunsalo (FI)

(72) Inventors: Vinski Bräysy, Oulunsalo (FI); Jarmo Sääski, Oulunsalo (FI); Mikko Heikkinen, Oulunsalo (FI); Ilpo Hänninen, Oulunsalo (FI); Pasi Korhonen, Oulunsalo (FI); Giovanni Ferri, Oulunsalo (FI)

(73) Assignee: TACTOTEK OY, Oulunsalo (FI)

( * ) Notice: Subject to any disclaimer, the term of this patent is extended or adjusted under 35 U.S.C. 154(b) by 0 days.

(21) Appl. No.: 17/704,393

(22) Filed: Mar. 25, 2022

(51) Int. Cl.
*F21V 8/00* (2006.01)

(52) U.S. Cl.
CPC ......... *G02B 6/0065* (2013.01); *G02B 6/0051* (2013.01); *G02B 6/0055* (2013.01); *G02B 6/0068* (2013.01); *G02B 6/0073* (2013.01)

(58) Field of Classification Search
CPC .................................................. G02B 6/0011
USPC ......................................................... 385/147
See application file for complete search history.

(56) References Cited

U.S. PATENT DOCUMENTS

| 11,060,707 | B2* | 7/2021 | Vasylyev | .................. F21V 9/30 |
| 2019/0324184 | A1* | 10/2019 | Cai | ........................ G02B 6/0021 |
| 2021/0048179 | A1* | 2/2021 | Vasylyev | ............. F21V 19/003 |

* cited by examiner

*Primary Examiner* — Sung H Pak
(74) *Attorney, Agent, or Firm* — Robert P. Michal, Esq.; Carter, DeLuca & Farrell LLP

(57) ABSTRACT

An integrated functional multilayer structure includes substrate film, circuitry provided upon the substrate film including a first light source and a monolithic lightguide layer, the lightguide layer includes a first surface and an opposite second surface, the second surface facing the first light source and a portion of the first surface containing, a pre-defined outcoupling area for the light emitted by the first light source and transmitted within the lightguide layer, the lightguide layer further containing a light leakage prohibition region and the attenuation of emitted light effectuated on a direct optical path between the first light source and the outcoupling area is less than the attenuation effectuating on a optical path between the first light source and the light leakage prohibition region. A related method of manufacture is also presented.

30 Claims, 7 Drawing Sheets

INTEGRATED OPTICALLY FUNCTIONAL MULTILAYER STRUCTURE AND RELATED METHOD OF MANUFACTURE

FIELD OF THE INVENTION

The present invention relates in general to integrated structures incorporating various functional features such as electronic, mechanical or optical elements. In particular, however not exclusively, the present invention concerns provision of such structures comprising a number of light sources adapted so as to emit light also outside the structure.

BACKGROUND

There exists a variety of different stacked assemblies and multilayer structures in the context of different functional ensembles e.g. in the field of electronics and electronic products. The motivation behind the integration of functionalities involving e.g. electronics, mechanical or optical features may be as diverse as the related use contexts. Relatively often size savings, weight savings, cost savings, or just efficient integration of components is sought for when the resulting solution ultimately exhibits a multilayer nature. In turn, the associated use scenarios may relate to product packages or casings, visual design of device housings, wearable electronics, personal electronic devices, displays, detectors or sensors, vehicle interiors, antennae, labels, vehicle electronics, etc.

Electronics such as electronic components, ICs (integrated circuit), and conductors, may be generally provided onto a substrate element by a plurality of different techniques. For example, ready-made electronics such as various surface mount devices (SMD) may be mounted on a substrate surface that ultimately forms an inner or outer interface layer of a multilayer structure. Additionally, technologies falling under the term "printed electronics" may be applied to actually produce electronics directly and additively to the associated substrate. The term "printed" refers in this context to various printing techniques capable of producing electronics/electrical elements from the printed matter, including but not limited to screen printing, flexography, and inkjet printing, through a substantially additive printing process. The used substrates may be flexible and printed materials organic, which is however, not always the case.

Furthermore, the concept of injection molded structural electronics (IMSE) involves building functional devices and parts therefor in the form of a multilayer structure, which encapsulates electronic functionality as seamlessly as possible. Characteristic to IMSE is also that the electronics is commonly manufactured into a real, or more real, 3D (non-planar) form in accordance with the 3D models of the overall target product, part or generally design. To achieve desired 3D layout of electronics on a 3D substrate and in the associated end product, the electronics may be still provided on an initially planar substrate, such as a film, using two dimensional (2D) methods of electronics assembly, whereupon the substrate, already accommodating the electronics, may be formed into a desired three-dimensional, i.e. 3D, shape and subjected to overmolding, for example, by suitable plastic material that covers and embeds the underlying elements such as electronics, thus protecting and potentially hiding the elements from the environment. Further layers and elements may be naturally added to the construction.

In connection with integrated structures packed with various optically functional features such as light sources, various challenges easily emerge and are advantageously addressed.

For example, undesired light leakage out from a structure and between different internal volumes and areas thereto may easily cause both functional and aesthetic issues in the areas of e.g., illumination and sensing, as being easily comprehended by a person skilled in the art. Traditionally, different additional light block parts, material layers, light-guiding arrangements, cavity structures, machining, etc. have been therefore adopted to tackle the issue. However, these traditional solutions typically add to the cost, weight, thickness and generally size, complexity and thereby manufacturing time of the structure, and sometimes even resulting yield, while further requiring preparing and using of various tools. Yet, the end result may not be perfect from the standpoint of considered optical objectives originally set to the structure.

Additionally, achieving high resolution control of internal and outcoupled light in terms of e.g. illuminated surface area shape, size, and location may at least occasionally turn out difficult with highly integrated structures. Achieving a wanted end result may require positioning the light sources sub-optimally close to desired exit or "outcoupling" surfaces of the light while being forced to stick with a rather limited number of orientations or types the light sources are typically made available, with reference to e.g. ordinary top- or side-shooting LEDs.

In various applications, controlling or specifically improving e.g., the uniformity of light over its outcoupling surface has been previously found burdensome. This may be an important issue when the surface contains an icon or symbol to be evenly lit to indicate to a viewer external to the structure that a device functionality or status associated with the icon or symbol is active, for example. Simply harnessing several light sources to more effectively lit up a joint target area or feature, such as an icon, may still cause illumination hot spots and leakage while also requiring more, often precious, power and space. Adding light guiding or processing elements into the structure has, in turn, its own drawbacks as already mentioned above.

Occasionally light sources included in an integrated structure to illuminate e.g. certain internal features or the environment of the structure should remain hidden from external perception. Placing additional masking elements or layers, such as printed layers, on the optical path of the light sources solely to better hide them from the environment may work in a limited fashion but it is usually also detrimental to the optical efficiency of the structure and the masking effect may be difficult to reliably control during manufacturing, thus causing poor yield. In any case, the structure becomes bulkier, heavier and more complex, while setting further limitations on e.g., the usability of further optical features along the optical path.

Yet, in the field of these optically functional integral structures, such as LED matrix or segment displays, an optical dividing grid may be embedded in the structure. It is commonly combined with some overlay material in the form of a material sheet, which causes various issues such as a greatly increased thickness of the overall structure, considerable amount of assembly work especially when real 3D structures such as curved or double curved structures are prepared, color related limitations as well as design constraints in terms of appearance and configuration in general.

Still, reworking of included, e.g. optically functional, features has been really difficult if not fully impossible with current highly integrated structures. Changing or updating parts has typically required severe dismantling and breaking of an existing structure in the past.

SUMMARY

The objective of the present invention is to at least alleviate one or more of the drawbacks associated with the known solutions in the context of optically functional integrated structures, concerned host devices, and related methods of manufacture.

The objective is achieved with various embodiments of an integrated, functional multilayer structure and related method for providing the multilayer structure.

According to one aspect, an integrated functional multilayer structure, comprises a flexible, preferably 3D-formable and thermoplastic, substrate film, circuitry provided upon the substrate film, said circuitry comprising a first light source containing at least one light-emission unit, optionally LED, and a monolithic lightguide layer molded upon the substrate film so as to cover and optically couple to the first light source, the lightguide layer comprising optically attenuating, translucent material, wherein the lightguide layer comprises a first surface and an opposite second surface, the second surface facing the first light source and a portion of the first surface containing, within a first distance (H) from the first light source, a pre-defined outcoupling area for the light emitted by the first light source and transmitted within the lightguide layer, said lightguide layer further containing a light leakage prohibition region non-overlapping with the outcoupling area and separated from the first light source by at least a second, preferably greater, distance (D), and the attenuation of emitted light effectuated on a direct optical path between the first light source and the outcoupling area is less than the attenuation effectuating on a shortest, optionally also direct, optical path between the first light source and the light leakage prohibition region, and preferably further wherein the optical transmittance of the translucent material of the lightguide layer is between about 25% and about 80% at selected wavelengths (e.g. visible light, infrared and/or other target wavelengths) of about 2 mm thick sample of the translucent material and/or the associated half power angle is between about 5 and about 70 degrees.

As the lightguide material may in some embodiments comprise e.g. sub-volumes or sections of mutually different properties (e.g., substantially one or more clear portions or sections optionally having about 90%, 95% or higher transmittance and/or half-power angle of about few degrees or essentially 0% degrees could be included), suitable optical characteristics may also be considered sub-volume or section specifically. In some embodiments, a preferred half power angle for the above sample could also be higher than 70 degrees at least in selected wavelength(s). Yet, the angle may be dependent on the wavelength of light. In some embodiments, the angle may vary between about 10 and 50 deg in the range of target wavelengths, for instance. In some embodiments, the half power angle should be at least about 10 or 20 deg in the selected wavelength(s). In these or other embodiments, the half power angle should not be preferably more than about 50 or 60 degrees, respectively.

The used translucent material may exhibit a desired color (red, blue, green, yellow, etc.), i.e., the material may better reflect or transmit certain wavelenghts and filter out others by absorption, for instance. The translucent material may in some preferred embodiments exhibit, for example, an essentially white or whitish appearance. The material may emit correspondingly, substantially all or most visible, wavelengths of 400-700 nm. Alternatively, the material may appear very opaque, such as dark if not essentially black, which means most wavelenghts are seriously absorbed or otherwise attenuated by the material. Material characteristics such as color(s) exhibited/wavelenghts filtered may be due to a color pigment or masterbatch applied originally in a clear resin as described hereinafter in more detail. In some preferred embodiments, the desired transmittance may be between about 50% and about 60% (2 cm thick sample). Preferred half power angle may be, for example, between about 40 and about 50 degrees with a sample of similar thickness.

A so-called light depletion distance (DD) from the first light source indicative of a selected major or dominant, e.g. 90% or considerably more as discussed below, amount of intensity loss of the emitted light at selected, preferably e.g., at least visible, wavelengths of light emitted by the first light source, while propagating in the translucent material, is advantageously between the first (H) and second (D) distances, or substantially corresponds to the first (H) or second (D) distance.

A related depletion characteristic or indicator may be first determined through measuring e.g., on the surface of the material by comparing surface areas and/or specifically e.g., areas of icons provided thereon (printed, coated, mask aperture based, etc.) in terms of their optical emission characteristics such as luminance due to the light emitted by the first light source. For instance, the ratio of the maximum luminance (L_max_leaked) of an area outside the outcoupling area with respect to the average luminance (L_average_illuminated) of a purposefully illuminated area (e.g., the outcoupling area or a sub-area thereof, preferably still greater than the area outside the outcoupling area) may be determined (i.e., L_max_leaked/L_average_illuminated).

The diameter or size of the area outside the outcoupling area used in the comparison as the numerator may be selected case-specifically, but e.g. half linewidth of an icon could be considered, or a selected percentage of the diameter or size of the area of the purposefully illuminated area used, in turn, as the reference type of a divider in the ratio, for instance. A desired threshold such as 10% (corresponding to ratio 0.1) or preferably less, such as about 1%, about 0.1% or less, may be selected for the ratio. The distance from the first light source to a particular area outside the outcoupling area on the lightguide layer providing the selected threshold may be then deemed the light depletion distance. In many practical applications, the depletion distance may be e.g., in the order of magnitude of about few millimetre, a centimetre or a few centimetres, or more, as being understood by a person skilled in the art based on the teachings and considerations provided herein. In some alternative embodiments, both the luminances measured for determining the ratio could be maximum or average luminances. Additionally or alternatively, the areas considered in the ratio could be of same diameter or size.

Correspondingly, the light leakage prohibition region may define a portion or portions of the first surface of the lightguide layer and the intensity of light of the first light source outcoupled via the light leakage prohibition region via said portion of the first surface of the lightguide layer is then preferably less than about 5%, more preferably less than about 2% or 1%, and most preferably less than about 0.1%, of the light emitted by the first light source at selected, preferably at least visible, wavelengths and outcoupled via the outcoupling area. Clearly the intensity of the light outcoupled via said portion, or any such portion, should preferably be less or equal, at most, than provided at the depletion distance. Generally, luminance determinations (typically measured as Cd/m^2) and ratios (and e.g., areas) similar to the ones as discussed above may be again considered for light intensity measurements and subsequent percentage determinations, respectively.

Further, selected surface area(s) such as the outcoupling area, a portion thereof (e.g. an illuminated icon thereon, or a part of the icon), or a surface area included in, defined by or consisting of the light leakage prohibition region on the first surface of the lightguide layer may preferably exhibit a luminance uniformity of a desired value, such as at least about 50%, or more preferably, at least about 70%, responsive to the light of the first light source outcoupled therethrough. A desired method to measure the uniformity may be flexibly picked or determined by a person skilled in the art but one applicable definition is minimum luminance/maximum luminance ratio (e.g. 0.7 ratio thus naturally corresponding to 70% uniformity). In the case of icons, the diameter of a measurement area may correspond to the linewidth of the icon, for example. Generally, a greater target surface area under scrutiny may be divided into a number of typically non-overlapping measurement (sub-) areas of preferably equal size (e.g., 4, 6, 8, or 10 areas, or more) from which the areas providing max and min luminances are first identified for subsequently determining the ratio. In this and other measurements focusing on light or light intensity related characteristics, or specifically e.g., luminance, suitable gear such as a luminance meter may be applied.

Considerations provided above and hereinlater relative to the first light source are naturally generally applicable to other light sources and their respective outcoupling areas, light leakage prohibition regions, and relevant related distances as well, mutatis mutandis.

The structure may optionally comprise a second light source provided upon the substrate film and covered by the lightguide layer, said second light source being configured so as to emit light into the lightguide layer and outcouple therefrom through at least a portion of the light leakage prohibition region of the first light source, the distance between the second light source and light leakage prohibition region being less than the second distance (D). The light leakage prohibition region of the first light source may thus contain at least part of the light outcoupling area of the second light source.

The second light source may have been positioned and optionally aligned so that the intensity of light emitted by it and reaching the outcoupling area of the first light source is less than the intensity of light reaching the light leakage prohibition region of the first light source. Accordingly, the light leakage prohibition region of the second light source may contain at least part of the outcoupling area of the first light source.

Further light sources may also be included in the multilayer structure. Each of the light sources may be optionally configured generally according to the principles mentioned above such that the outcoupled light therefrom do not substantially reach light prohibition regions of other sources while reaching, with desired intensity and/or other characteristics, their own outcoupling area on the first surface. Additionally or alternatively, some light sources included may mutually have at least partially joined outcoupling areas and/or light leakage prohibition regions.

In accordance with the principles generally set forth herein, preferably at least the first light source has been oriented at least in terms of its light emission direction(s) so as to provide or direct more light towards the associated outcoupling area than the light leakage prohibition region, and/or to make the resulting outcoupling area large(r) and (more) distant, or vice versa.

In a further aspect, a method for manufacturing an integrated functional multilayer structure, comprising:

obtaining a flexible substrate film preferably comprising formable, optionally thermoformable, material;

providing circuitry upon the substrate film preferably utilizing printed electronics technology and/or selected mounting technology, said circuitry comprising a first light source containing at least one light-emission unit, optionally LED;

producing a monolithic lightguide layer of optically attenuating, translucent and preferably also thermoplastic material optionally by molding or casting, upon the substrate film to cover, optically couple to, and preferably also at least partially embed the first light source;

wherein the lightguide layer and the first light source are mutually configured so that the lightguide layer comprises a first surface and an opposite second surface, the second surface facing the first light source and a portion of the first surface containing, within a first distance (H) from the first light source, a pre-defined outcoupling area for the light emitted by the first light source and transmitted within the lightguide layer, said lightguide layer further containing a light leakage prohibition region non-overlapping with the outcoupling area and separated from the first light source by at least a second, preferably greater, distance (D), and that the attenuation of emitted light effectuated on a direct optical path between the first light source and the outcoupling area is less than the attenuation effectuating on a shortest, optionally also direct, optical path between the first light source and the light leakage prohibition region, and further wherein the optical transmittance of the translucent material of the lightguide layer is between about 25% and about 80% at selected wavelengths of about 2 mm thick sample of the translucent material while the associated half power angle is between about 5 and about 70 degrees.

The present invention provides different advantages over a great variety of previously carried out solutions, naturally depending on each particular embodiment thereof.

In various embodiments, optically attenuating (scattering and/or absorbing) translucent and potentially tinted or more strongly colored material such as typically thermoplastic resin, which is generally quite flexibly selectable or configurable, may be utilized as lightguide material in the structure to cleverly control light propagation and limit it to desired areas and distances while avoiding substantial leakage to non-desired areas called light leakage prohibition regions. Accordingly, different surfaces, icons, symbols, shapes, other features and structures may be effectively and controllably illuminated while not exposing non-target areas, even close or adjacent ones, to similar lighting. This facilitates providing highly integrated, smaller size structures wherein different features can be located close to each other without causing mutual issues due to their shortish distance.

The used light sources may be provided with carrier elements that enable, for example, orientating the sources as desired thus offering a possibility to adjust their emission directions and resulting outcoupling areas in terms of their position and size, for example, flexibly. For instance, a top-shooting (top-emitting) light source may be tilted such that its beam is laterally shifted from directly above the light source towards the side(s). Various embodiments of the present invention can be made or implemented substantially tooling independent and thus it can easily cope with e.g. different print layouts. Yet, the present invention offers a low cost and relatively easy approach to implement solutions for many purposes. As quite many feasible lightguide materials have a lowish injection molding temperature, use of e.g., IMSE technology may be made more reliable and the associated yield improved in contrast to materials requiring high molding temperatures easily negatively affecting the functionality and condition of features already existing on the substrate film(s) or other elements subjected to such temperatures.

The aforesaid lightguide material is advantageously scattering or diffusive (large scale scattering or multiple scattering can be deemed diffusion) in a way that the illumination effect obtained by an embedded light source e.g., on a selected target surface of the structure, e.g. exterior surface, which may contain e.g. an icon or other graphical element to be illuminated, is uniform without obvious hot spots or dark areas, while still avoiding noticeable or at least excessive light leakage to adjacent areas, which may be optionally associated with different light source(s) and target features such as icons to be illuminated separately.

The color, translucency or diffusion properties of the used material(s), such as the lightguide material, may be configured by mixing additives such as a selected masterbatch or pigment based color additive therein, for instance. Yet, the material of the lightguide layer or other layer(s) may locally vary even within the very same integral layer or piece in terms of its properties such as attenuation or particularly diffusion, obtained by varying the material properties such as mixing ratio during manufacturing or application thereof.

Various embodiments of the present invention further enable, by clever joint configuration of the used materials, light sources, and e.g. their mutual positioning, orientation as well as dimensions, also providing so-called "hidden until lit" effect e.g., in the IMSE structures. For example, elements such as graphical symbols provided in the structure or various components as well as e.g., conductive traces can be obscured from external visual perception until a light source targeted to illuminate them is activated. With these kinds of embodiments of the present invention, it is possible to have decorative surface prints on the outcoupling areas and e.g. on associated film (not just openings), and by embedding features to be masked from easy external visual perception e.g., several mm deep in the lightguide material, related optical aspects are much more convenient to control than with very shallow layers. The suggested solution is also time and cost saving process-wise.

For implementing e.g. (LED) matrix or segment displays, various embodiments of the present invention provide clear benefits as they reduce or overcome the common issues with light bleed (leakage) and uniformity, and further enable achieving 3D shape displays such as curved or 3D dome shaped displays. Also less wiring (traces) is required.

Still, to improve light uniformity in target areas and reducing the number of required light sources even further, the multilayer structures described herein may contain one or more diffusers that may be even monolithic with the lightguide material.

In various embodiments, a number of elements of the multilayer structure, such as at least one light source, may be included in a module the internals of which remain accessible subsequent to manufacturing of the structure via a detachable cover. Accordingly the included elements may be conveniently accessed for inspection, repair, rework, reprogramming, or replacement purposes, for example. The module may include a wall structure and internal hollow section, which accommodates one or more elements and optionally a joint carrier such as a circuit board for such.

In some embodiments, a reflector may be provided around one or more light sources for reducing light leakage and improving light intensity and uniformity on target outcoupling surface, for example. The reflector may be conveniently implemented together with e.g. the module and circuit board aspects discussed above.

Various other advantages different embodiments of the present invention offer will become clear to a skilled person based on the following detailed description.

The expression "a number of" may herein refer to any positive integer starting from one (1), e.g., to one (1), two (2), or three (3).

The expression "a plurality of" may refer to any positive integer starting from two (2), respectively.

The terms "first" and "second" are herein used to distinguish one element from other element(s), and not to specially prioritize or order them, if not otherwise explicitly stated.

The exemplary embodiments of the present invention presented herein are not to be interpreted to pose limitations to the applicability of the appended claims. The verb "to comprise" is used herein as an open limitation that does not exclude the existence of also un-recited features. The features recited in various embodiments and e.g. dependent claims are mutually freely combinable unless otherwise explicitly stated.

The novel features which are considered as characteristic of the present invention are set forth in particular in the appended claims. The present invention itself, however, both as to its construction and its method of operation, together with additional objectives and advantages thereof, will be best understood from the following description of specific embodiments when read in connection with the accompanying drawings.

BRIEF DESCRIPTION OF FIGURES

Some embodiments of the invention are illustrated by way of example, and not by way of limitation, in the figures of the accompanying drawings.

DETAILED DESCRIPTION OF SOME EMBODIMENTS

Figure 1:
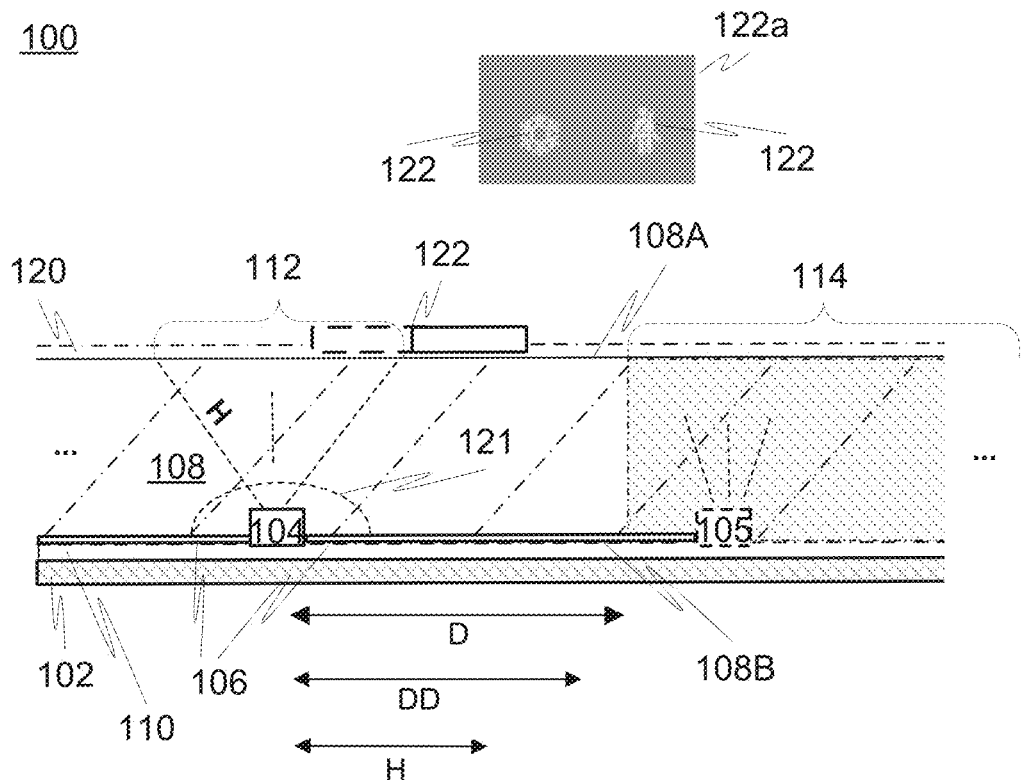
FIG. 1 illustrates various aspects of the present invention via an embodiment of a multilayer structure in accordance therewith.

FIG. 1 illustrates, at 100, an embodiment of a multilayer structure in accordance with the present invention.

The multilayer structure includes at least one substrate film 102, which is preferably of flexible and 3D-formable (shapeable) material, such as thermoformable (plastic) material. As being easily comprehended by a person skilled in the art, instead of a single, optionally monolithic film 102, the substrate film 102 could be of a multilayer and/or multi-section construction with mutually different layers at least in places, for instance.

Item 108 refers to at least one lightguide layer preferably provided by molding on the substrate film 102, and optionally between the substrate film 102 and element 120, which may be another (substrate) film, either different from or similar to the film 102, for example.

The lightguide layer 108 comprises a first side and a related first surface 108A that is advantageously targeted towards the use environment of the structure and e.g., a user of the structure, or a device containing the structure, therein. Yet, the substrate film 102 comprises an opposite, second side and associated second surface 108B essentially facing the structure internals or a host device, for instance.

As alluded to hereinbefore, item 120 may refer to at least one further film, coating, or other functional element. In many embodiments, there may be multiple of such at least locally stacked upon the surface 108A.

The substrate film 102 and/or further film(s) 120 or generally material layer(s) included in the multilayer structure may comprise at least one material selected from the group consisting of: polymer, thermoplastic material, electrically insulating material, PMMA (Polymethyl methacrylate), Poly Carbonate (PC), flame retardant PC film, copolyester, copolyester resin, polyimide, a copolymer of Methyl Methacrylate and Styrene (MS resin), glass, Polyethylene Terephthalate (PET), carbon fiber, organic material, biomaterial, leather, wood, textile, fabric, metal, organic natural material, solid wood, veneer, plywood, bark, tree bark, birch bark, cork, natural leather, natural textile or fabric material, naturally grown material, cotton, wool, linen, silk, and any combination of the above.

The thickness of the film 102 and optionally of further film(s) or layer(s) 120 may vary depending on the embodiment; it may only be of few tens or hundreds of a millimeter, or considerably thicker, in the magnitude of one or few millimeter(s), for example.

The thickness of the lightguide layer 108 may also be selected case-specifically but thicknesses of few millimeters, such as about 2-5 millimeters, may be applied. The thickness may be considerably more as well, e.g. about 1 cm or more at least in places. The thickness may indeed locally vary. The lightguide layer 108 may optionally comprise recesses or internal cavities for light guiding, processing, and/or thermal management purposes, for instance, in addition to accommodating various elements such as electronic or optical elements.

Item 104 refers to circuitry, and specifically circuitry including a light source type circuitry or component, provided on the substrate film 102. In case the structure contains a further film 120, it could be provided with circuitry including e.g., light source(s) as well and be optionally electrically or electromagnetically connected to the circuitry on film 102 via intermediate wiring or wirelessly (e.g. capacitively or inductively), for instance.

In the shown case, the (first) light source 104 is emissive as indicated by the dotted lines extending from the source 104 to a target outcoupling area 112 on the lightguide layer 108. It 104 may be e.g. a top-shooting LED. The outcoupling area 112 is within a first distance H from the light source 104. The shortest distance between the first light source 104 and the outcoupling area 112 is thereby equal or less than the first distance H.

Preferably but not necessarily, in various embodiments the shortest distance is less than about 20 millimeters, more preferably less than about 10 millimeters, even more preferably less than about 8 millimeters, and most preferably less than about 5 millimeters, such as about 2-5 millimeters. Likewise, the order of magnitude of the first distance H, defining outer limit for the distance between the first light source 104 and related outcoupling area 112, may be about similar or greater as being understood by a person skilled in the art.

Item 105 refers to a possible further, or second, light source, which may be similar to or different from the first light source 104 in terms of e.g. emission characteristics (emission technology, wavelength, power, beam type and direction, etc.), construction, or dimensions. The second light source 105 is positioned at a distance from the first light source 104. The distance may be selected case-specifically. For the sake of completeness, it shall be mentioned that in various embodiments of the present invention, there may naturally be a larger number of light sources 104, 105 embedded. They may be jointly or independently controllable by the included or at least functionally connected control circuit(s).

In supplementary or alternative embodiments, the light source 104, 105 could be any of top-emitting, side-emitting, dual side emitting, and bottom emitting LED or other type of a light source, for instance. Generally, e.g. a packaged semiconductor type or a chip-on-board semiconductor type light source, preferably LED, may be used. Still packaging-wise, the light source 104, 105 could be optionally of flip-chip type. In some embodiments, the light source 104 may contain multiple (two, three, four, or more) light-emission units such as LEDs packaged or at least grouped together. For example, a multi-color or specifically RGB (Red-Green-Blue) LED of several LED emitters could be provided within a single package.

Item 114 refers to a light prohibition region that preferably does not receive much light from and/or pass through much light of the first light source 104. The aforesaid optional second light source 105 may still be positioned within the light prohibition region 104, for instance, or at least closer to it than the first light source 104. The first light source 104 has, in the concerned embodiment, direct lines of sight (LOS) essentially free of light blocking elements both with the outcoupling area 112 and the light leakage prohibition region 114.

In some embodiments, the light prohibition region 114 may essentially consist of a surface region or area of the lightguide layer 108 on the first surface 108A. In some other embodiments, it may additionally or alternatively, at least comprise or consist of a volume or area (e.g. at least plane transverse to the substrate film 102 at a distance D) of the lightguide layer 108 below the surface 108A, which has been indicated in FIG. 1 by the dotted fill pattern surrounding the second light source 105.

Indeed, the light leakage prohibition region 114 may in some embodiments define, for example, a selected, optionally essentially cubical, cuboidal or cylindrical, sub-volume of the lightguide layer 108 optionally extending through the lightguide layer 108 in a direction spanning the first 108A and second 108B surfaces.

Yet, the light prohibition region 114 may, depending on the embodiment, comprise a a plurality of surface regions e.g., at least one region on surfaces 108A and 108B of the lightguide layer 108.

Preferably, the structure 100 is configured in terms of e.g., dimensions, feature such as component, element, or material layer positions and alignment, and used materials in a way that the light of the first light source 104 reaching the light prohibition region 114 is less than a threshold amount (threshold being deemed a depletion distance DD), which may be determined case specifically in terms of a selected criterion such as luminous intensity, illuminance, or luminance as also discussed hereinelsewhere in more detail.

Accordingly, depletion of light on its way from the light source 104 towards the prohibition region 114 may be generally controlled, for example, by the (selection and/or preparation of) translucent material of the lightguide layer 108 through attenuation characteristics thereof, essentially including scattering (diffusion) and absorption. Yet, depletion may be controlled e.g., by the position of the light source 114 and its distance D to the region 114, which is preferably greater than the distance H.

In preferred embodiments, the optical transmittance of translucent material selected for the lightguide layer 108 may be between about 25% and about 80% at selected wavelengths such as at least part of the visible wavelengths, considering e.g., about 2 mm or 3 mm thick sample of the translucent material. The associated half power angle can be between about 5 and about 70 or 75 degrees (intensity based). In different use scenarios, desired transmittance and scattering may naturally still vary. As mentioned hereinbefore, in some embodiments the lightguide layer 108 may contain, at least in places, material that is essentially transparent (e.g. 95% transmittance or more and low if not essentially zero deg half-power angle).

Suitable translucency and attenuation of the lightguide layer 108 may be reached by employing scattering elements in the lightguide material, for example. When the amount of scattering elements is increased, scattering/diffusion and half power angle, as one possible measurable indicator, are increased as well while luminous transmission through the layer will generally decrease. Correspondingly, increasing layer thickness generally increases scattering/diffusion properties such as the half power angle and decreases transmission.

While considering e.g. the scattering (diffusion) properties as discussed above, the lightguide layer 108 may generally comprise, for example, at least one material selected from the group consisting of: polymer, organic material, biomaterial, composite material, thermoplastic material, thermosetting material, elastomeric resin, PC, PMMA, ABS, PET, copolyester, copolyester resin, nylon (PA, polyamide), PP (polypropylene), TPU (thermoplastic polyurethane), polystyrene (GPPS), TPSiV (thermoplastic silicone vulcanizate), and MS resin.

One example of a polycarbonate based applicable material is Makrolon™ available in a variety of colors/tinting (e.g. white/whitish and black/blackish or dark), transparencies and scattering characteristics. E.g. color code 021182 ("cool white") may be considered.

As discussed above, tinted or more strongly colored resin may provide a feasible option for the lightguide layer 108 to limit undesired light leakage within and outside the structure 100 to close elements and hide the internals such as light sources 104, 105 or other circuitry from external perception. Originally e.g. clear base material such as plastic resin (e.g. polycarbonate) may be doped with a colored masterbatch. In many use scenarios wherein the structure 100 should be only perhaps few millimeters or a centimeter thick in total, whereupon the lightguide layer 108 should be even thinner, using 2-4 millimeter, e.g. 3 mm, plastic resin provided with selected masterbatch (e.g. white or desired selective wavelength resin) in a desired concentration (e.g. let-down ratio of about 1%) as the lightguide layer 108 may provide quite satisfying results. Generally, in many embodiments in the context of the present invention, a feasible let-down (dosing or doping) ratio is indeed about 5%, 4%, 3%, 2%, 1% or less. For example, suitable masterbatches for the purpose are provided by Lifocolor™.

Further, provided that the light source(s) 104, 105 provided on the film 102 for illuminating their dedicated, different target outcoupling areas 112, are mutually separated by a decent distance, e.g. about 4 millimeters, good illumination uniformity is obtained on the outcoupling area(s) 112 without considerable light leakage to neighbouring areas including prohibition region(s) 114 either.

It has been found out that with a 12 mA LED type light source, the intensity of light measured on the surface of the lightguide layer 108 at a lateral separation of approximately only 15 millimeters from the underlying position of the actual LED, is only a small fraction such as equal to or less than about 5%, 1%, or 0.1% of the original intensity, which is more than feasible attenuation for many real-life use scenarios in terms of undesired light leakage.

In case the lightguide layer 108 exhibits a substantially white or whitish color, the color perceivable in the environment may be cleverly adjusted by the light sources and their emission wavelengths, as being understood by a skilled person. By a multi-color light source such as RGB-LED (Red-Green-Blue LED), or a plurality of grouped light sources emitting mutually different wavelength(s), such adjustments may be done flexibly.

The afore-discussed "hidden until lit" effect may be achieved, for instance, by adding translucent, e.g. selected color exhibiting, masterbatch in the injection molded base resin constituting the lightguide layer 108. Yet, the used substrate film 102 may be substantially opaque, black and/or otherwise exhibitive of dark colour. Accordingly, it is possible to provide "invisible until lit icons" on the surface 108A, with reference to e.g., printed elements 122, clear or translucent film 120 with printed icons, and/or opaque/dark/color film arranged with one or more openings among other options. Using e.g. about 3% of translucent black color masterbatch may be sufficient to visually hide underlying components such as circuitry or light source 104 and e.g., traces 106 from external perception. The embedded underlying elements such as components and traces may be additionally prepared from dark color—providing, preferably optically highly attenuating or absorbing materials. Alternatively, transparent materials could be utilized. Different illumination effects may be achieved with different colors. The translucent material of the lightguide layer 108 may be generally or selectively matched to the color(s) used on the surface 108A, such as the color(s) exhibited by the inks or films thereat.

As mentioned above, using white color exhibiting resin as the lightguide layer 108 and with a suitable configuration of multi-color light sources such as RGB-LEDs embedded, basically any color may be lit according to the configuration upon need on the (white) surface 108A.

In order to measure and characterize scattering (diffusion) properties of a considered or selected material, a piece of the material (e.g. one corresponding to the dimensions of the lightguide layer 108, or a representative sample of other size) may be covered by a mask containing a small orifice and be illuminated from the back side. A goniometer may be used to measure the intensity of light coming through the hole in different angles to determine e.g., the half power angle.

Scattering or diffusion (multiple scattering taking place in materials can be deemed diffusion) may be also characterized and determined based on a level of so-called haze of the translucent material. Haze can be defined as a share of diffuse transmission from the total transmission of an examined piece or sample of material. Haze may be measured or determined based on a selected standard such as ASTM D1003. The haze may be (percentage of diffuse transmission exceeding 2.5 degrees from the incident beam from the overall transmitted light), in the context of various embodiments of the present invention, e.g. about or at least about 20%, 30%, 40%, 50%, 60%, or more. A hazemeter or photometer may be utilized for the measurements, for instance, in accordance with a selected testing method or standard such as the one mentioned above. Accordingly, there are different methods and approaches that may be selectively used, by a person skilled in the art, to select, verify and compare a number of different materials and their configurations (dimensions, doping/mixing with additives, etc.) from the standpoint of the present invention.

The aforementioned second light source 105, if included, may in some embodiments be configured so as to emit light into the lightguide layer 108 and outcouple therefrom through at least a portion of the light leakage prohibition region 114 of the first light source 104. The second light source 105 may be positioned and optionally aligned so that the intensity of light emitted by it and reaching the outcoupling area 112 of the first light source 104 is less than the intensity of light reaching the light leakage prohibition region 114. The distance between the second light source 105 and light leakage prohibition region 114 may be thus less than the second distance D.

Accordingly, in some embodiments the first 104 and second 105 light sources may have at least partially a mirror-like functional and optionally also dimensional or positional configuration in the structure 100; each of them 104, 105 may have their own outcoupling areas that also define at least part of the other light source's light prohibition region. The sources 104, 105 may be controlled to optionally dynamically (e.g. alternately or generally at times, and/or independently) to illuminate their own outcoupling areas and/or elements thereon, while not causing at least considerable issues such as light leakage and therefore undesired illumination of other light outcoupling regions.

Item 121 refers to optional encapsulant, glob top or other conformal coating, such as a Illumabond™ or Triggerbond™ for light shaping or other processing, protecting and/or securing purposes, for instance. The used substance may be dispensed on top of selected circuitry such as the first light source 104. It may be substantially clear (transparent), for example. Alternatively, it could be colored and/or translucent. In some embodiments, a specific optical function or feature such as a lens may be provided by the encapsulant. The lens could be diffusive, Fresnel or e.g. collimating, for example. Additionally or alternatively, a pre-made lens or generally optical component is possible to include within the structure as well.

As briefly alluded to above, item 122 may refer to at least one functional element that may have been attached and/or additively in-situ produced such as printed (e.g., screen printed, inkjetted, or 3D printed) on the first surface 108A of the lightguide layer 108, optionally positioned adjacent and/or upon the outcoupling area 112 or light leakage prohibition region 114. In case there is also e.g., a film 120 on the surface 108A, a functional element 122 could be on any side thereof, i.e. the side facing the lightguide layer 108 or the opposite side thus facing the environment. On the side facing the lightguide layer 108 the element 122 would be better protected from the environment.

The functional element(s) 122 may be selected from the group consisting of: light blocking (masking) element, graphical element (e.g. icon, symbol, pattern, alphanumeric element, picture, etc., which may have an indicative nature such as status indicator of a hosting or connected device), optical diffuser, reflector, dispersive element, and collimator. Optically the functional element(s) 122 as well as e.g. film(s) 102, 120 may be transparent, translucent or opaque, e.g. color prints or layers. Yet, item 122 may refer to e.g. conductive trace, electrode, electrical insulator, electronic component, circuit element, or a connector.

In some embodiments, the functional element could be monolithic with the lightguide layer 108, discussed in more detail with reference to FIG. 9 hereinafter.

Thus the functional element(s) 122 may have, among other options, indicative, optical, connecting, or electrical (conductive, insulating, sensing or other function) nature, for instance.

As mentioned above, the element(s) 122 may be positioned e.g., adjacent the outcoupling area 112 or partially or fully overlapping therewith. The first light source 104 may be configured to illuminate the element(s) 122 such as graphical elements in a way that they stand out visually to a user in the environment of the structure 100. Further light sources potentially included in the structure 100, such as the second light source 105, may have similar function in terms of the outcoupling areas/functional elements associated therewith (may differ or be the same as with the first source 104) as already discussed hereinbefore.

Item 122a illustrates an example of graphical, and in this example, particularly icon type elements 122, essentially a snowflake and seatbelt, positioned at a distance from each other, which could be then selectively illuminated by the underlying light source(s) included in the structure 100. For example, at least one of the elements 122 could be positioned within the first distance H (and thus also within the second distance D) from the first light source 104 on the outcoupling area 112 so as to be illuminated, when the light source 104 is on (emitting), by it. The remaining element 122 could be then positioned on the outcoupling area of the second light source 105, which may be included in the light prohibition region 114 of the first source 104, and be correspondingly illuminated by the second 105 or a further light source. A surface area indicative of the aforediscussed light depletion distance for the light of the first light source 104 could lie between the two elements 122. In any case, preferably the light sources 104, 105 are independently controllable to render the elements 122 independently perceivable also from the environment of the structure 100.

The remaining circuitry 106 included in the structure 100, besides a number of light source(s) 104, 105, may comprise e.g., electrically conductive traces or contact pads optionally printed on the film 102 and/or other material layers of the structure 100 using printed electronics technology. Such traces may be configured for power and/or data (e.g. signaling data or other data) transfer between elements such as a light source and related controller and/or power source, for example.

Yet, the circuitry 106 may generally comprise one or more electrodes, electrical connectors, electronic components and integrated circuits (IC), such as control circuits or data transfer circuits. The circuitry 106 may be directly produced in or for the structure 100 by selected method(s) such as printed electronics technology, optionally screen printing or other additive printing or generally coating technique.

Additionally or alternatively, the circuitry 106 may include a number of mounted components such as surface-mounted devices (SMD). Accordingly, non-conductive and/or conductive adhesive may be utilized for securing the mounted components on the carrier. In some embodiments, mechanical securing is implemented or at least enhanced by electrically non-conductive adhesive material whereas solder or other electrically highly conductive (but to lesser extend, adhesive type of) material is used for electrical connectivity.

If e.g. capacitive sensing of gestures such as touch or touchless gestures upon the structure 100 is to be implemented, sensing electrodes of the circuitry 106 may be configured (dimensioned, positioned, etc.) so that their sensing area or volume defined by e.g. the associated electric field is located as desired and thereby covers e.g. the area upon selected side walls and/or top of the structure, and/or other regions that should be made detection-wise sensitive to touch and/or touchless gestures. This type of configuring may be achieved or performed through the utilization of proper simulation or measurements, for instance.

Still, the circuitry 106 may comprise and/or the remaining multilayer structure may comprise at least one component selected from the group consisting of: electronic component, electromechanical component, electro-optical component, radiation-emitting component, light-emitting component, LED (light-emitting diode), OLED (organic LED), side-shooting LED or other light source, top-shooting LED or other light source, bottom-shooting LED or other light source, radiation detecting component, light-detecting or light-sensitive component, photodiode, phototransistor, photovoltaic device, sensor, micromechanical component, switch, touch switch, touch panel, proximity switch, touch sensor, atmospheric sensor, temperature sensor, pressure sensor, moisture sensor, gas sensor, proximity sensor, capacitive switch, capacitive sensor, projected capacitive sensor or switch, single-electrode capacitive switch or sensor, capacitive button, multi-electrode capacitive switch or sensor, self-capacitance sensor, mutual capacitive sensor, inductive sensor, sensor electrode, micromechanical component, UI element, user input element, vibration element, sound producing element, communication element, transmitter, receiver, transceiver, antenna, infrared (IR) receiver or transmitter, wireless communication element, wireless tag, radio tag, tag reader, data processing element, microprocessor, microcontroller, digital signal processor, signal processor, programmable logic chip, ASIC (application-specific integrated circuit), data storage element, and electronic sub-assembly.

The structure 100 may be and in many use scenarios will be connected to an external system or device such as a host device or host arrangement of the structure, which may be implemented by a connector, e.g. electrical connector, or connector cable that may be attached to the structure 100 and its elements such as circuitry 106 in a selected fashion, e.g. communications and/or power supply wise. The attachment point may be on a side or bottom of the structure, for example. A through-hole may be arranged in the film 102 for connectivity purposes.

In various embodiments, at least the first light source 104 may be generally oriented at least in terms of its light emission direction(s) generally so as to provide more light towards its target outcoupling area 112 than e.g., the light leakage prohibition region (114), and/or to adjust the resulting outcoupling area 112 larger and more distant or vice versa (smaller and closer).

Figure 2:
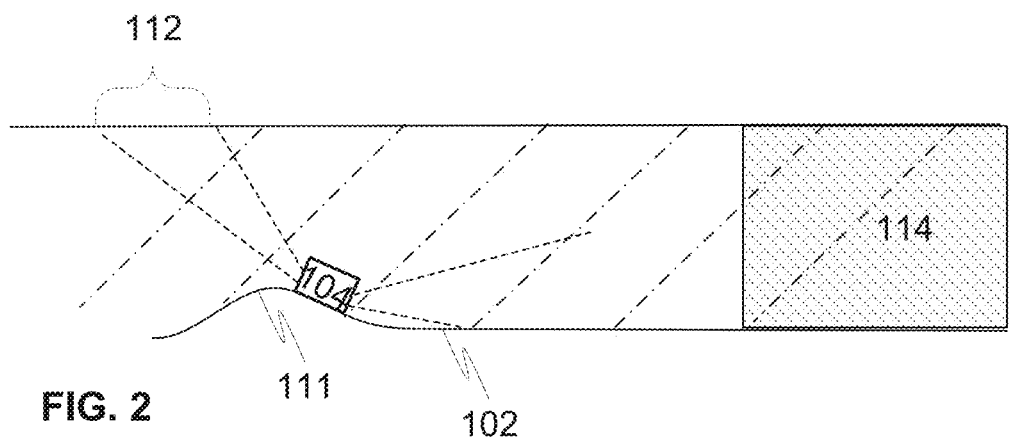
FIG. 2 illustrates one more embodiment, different features of which including e.g., 3D shaping of a substrate film portion hosting a light source, could be at least selectively utilized in addition to or instead of the ones of the other embodiments contemplated herein for carrying out the invention.

Relating to available options for positioning and orienting of the light source(s) of the structure 100 as desired in terms of their illumination characteristics, for example, FIG. 2 illustrates, at 200, an embodiment wherein the first light source 104 has been tilted, relative to a reference such as the top surface of the arrangement 200 or the original plane of the substrate film 102, by 3D shaping, preferably thermoforming, the hosting substrate film 102 so as to establish at least a local 3D shape such as protrusion or recess at the location of the first light source 104, thus tilting the source 104. Accordingly, emission direction(s) of the source 104 have been adjusted in a desired way. For example, a top-shooting light source may be adjusted to hit or shoot further away on the surface 108A (e.g. an icon or other graphical/functional element 122 may be conveniently illuminated from side, whereas the volume directly below the illuminated feature may be optionally utilized for other purpose, e.g. sensing and sensing electronics). A side-shooting light source may be additionally or alternatively adjusted to illuminate areas 112 on top of it (illustrated in the Figs.) Therefore, depending on the embodiment, tilting may facilitate illumination of larger or smaller areas than otherwise being possible, and/or obtaining better uniformity to the surface illumination.

Figure 3A:
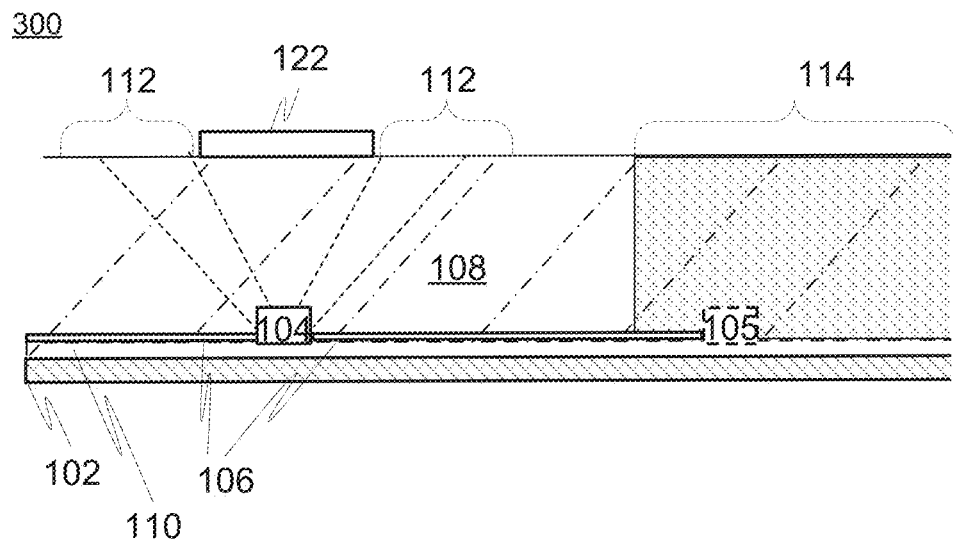
FIG. 3A illustrates one more embodiment, different features of which, such as the use of one or more side-shooting (side-emitting) light sources, optical masking or light control features, could be at least selectively utilized in addition to or instead of any of the ones of the other embodiments contemplated herein for carrying out the invention.

FIG. 3A illustrates, at 300, certain aspects already briefly discussed above. In certain embodiments, a light source such as the first light source 104 may be configured to illuminate several outcoupling areas 112 instead of a single unified area. Yet, the light source 104 may be configured so as to illuminate an outcoupling area 112 that is not directly above the source 104 but laterally shifted therefrom.

The several areas 112 and lateral shift may be achieved by the emission characteristics of the light source 104 itself and/or by the use of functional elements 122 such as light blocking or masking features on the related optical path, for example. The source 104 may be able to emit light in multiple (e.g. two) directions or essentially via two beams, considering e.g. a suitable side-emitting LED. Additionally or alternatively, a masking feature such as an opaque print may be used to divide an illumination pattern into several disconnected portions when externally visually inspected. Yet, a carrier element discussed in more detail with reference to FIG. 5 or 3D shaping of the substrate film 102 (revert to FIG. 2) may be utilized.

Figure 3B:
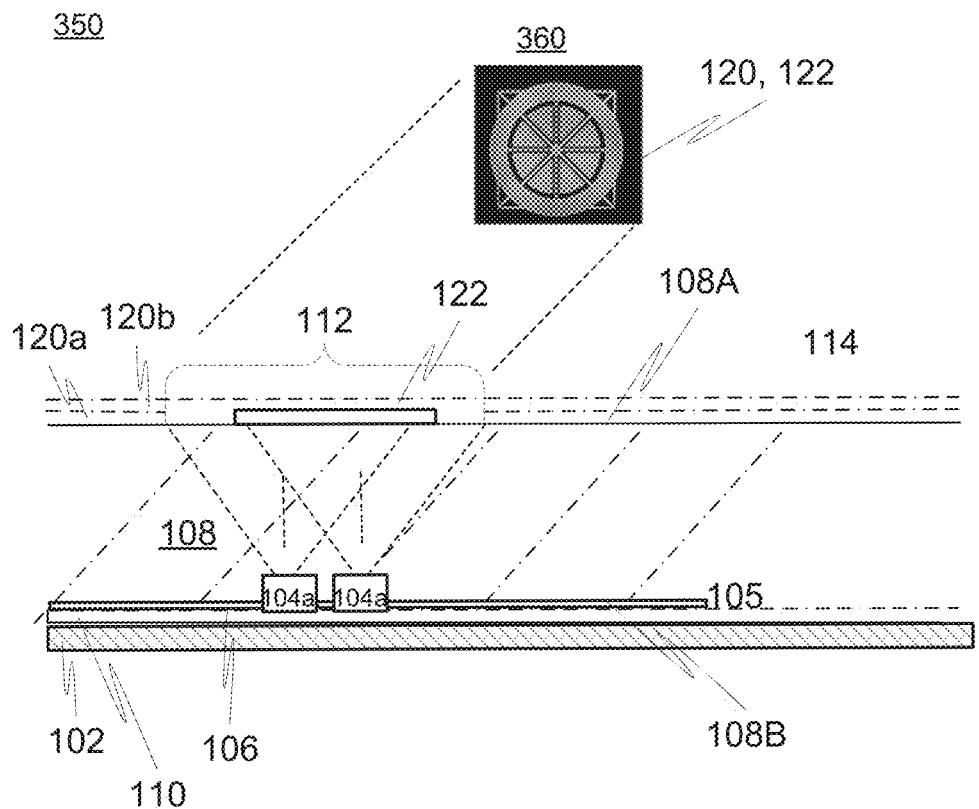
FIG. 3B illustrates one more embodiment, different features of which, such as the use of several light-emission units in a light source, could be at least selectively utilized in addition to or instead of any of the ones of the other embodiments contemplated herein for carrying out the invention.

Similarly, FIG. 3B illustrates, at 350, the use of several light-emission units 104a in at least functionally single light source 104. The units 104a may have mutually similar and/or different properties (emission direction, emission wavelengths/color, beam width, intensity, etc.). Together they 104a may span a larger outcoupling area 112 than otherwise possible. Still, light uniformity e.g., on the area 112 may be conveniently adjusted or "fine-tuned" by changing the units' proportional intensities, for instance. Different illumination effects such as fades, temporally and spatially complex illumination patterns, animation, etc. may be obtained on the area 112 and elements 122 such as icons or other graphical elements thereat.

By applying several light sources 104, 105 or at least several light-emission units 104a in a single source 104, 105, more complex features such as matrix or segment displays may also be implemented as already discussed hereinbefore. As with other applications and embodiments, diffusive translucent resin as the lightguide layer 108 may be used to block light just right. The light emitted from each source or emission unit can penetrate to surface and associated outcoupling area but due to a limited range within the translucent material, the light will not annoyingly mix with neighbouring outcoupling areas of other source(s) or unit(s) at least substantially. Additionally, surface features such as embossing, films or prints 120, 122 can be configured to provide a desired visual effect such as a pixel map appearance or 3D effect when required by the application in question.

At 360, it illustrated how by the combination of embedded light source(s) 104, 105, intermediate translucent lightguide layer 108, and e.g. top film(s) 120 and/or other functional element(s) 122 different externally visible dynamically illuminated elements such as symbols or matrix/segment displays could be cleverly constructed. E.g. by surrounding printed or laminated film-type, preferably substantially opaque, light blocks or masks 120, 122 the illumination effect could be limited to a desired outcoupling area 112. More transmissive, e.g. translucent and optionally color exhibiting print or film could in turn be used on the actual outcoupling area 112. Segment dividing lines could be implemented by local essentially opaque prints or films, for instance.

Figure 4:
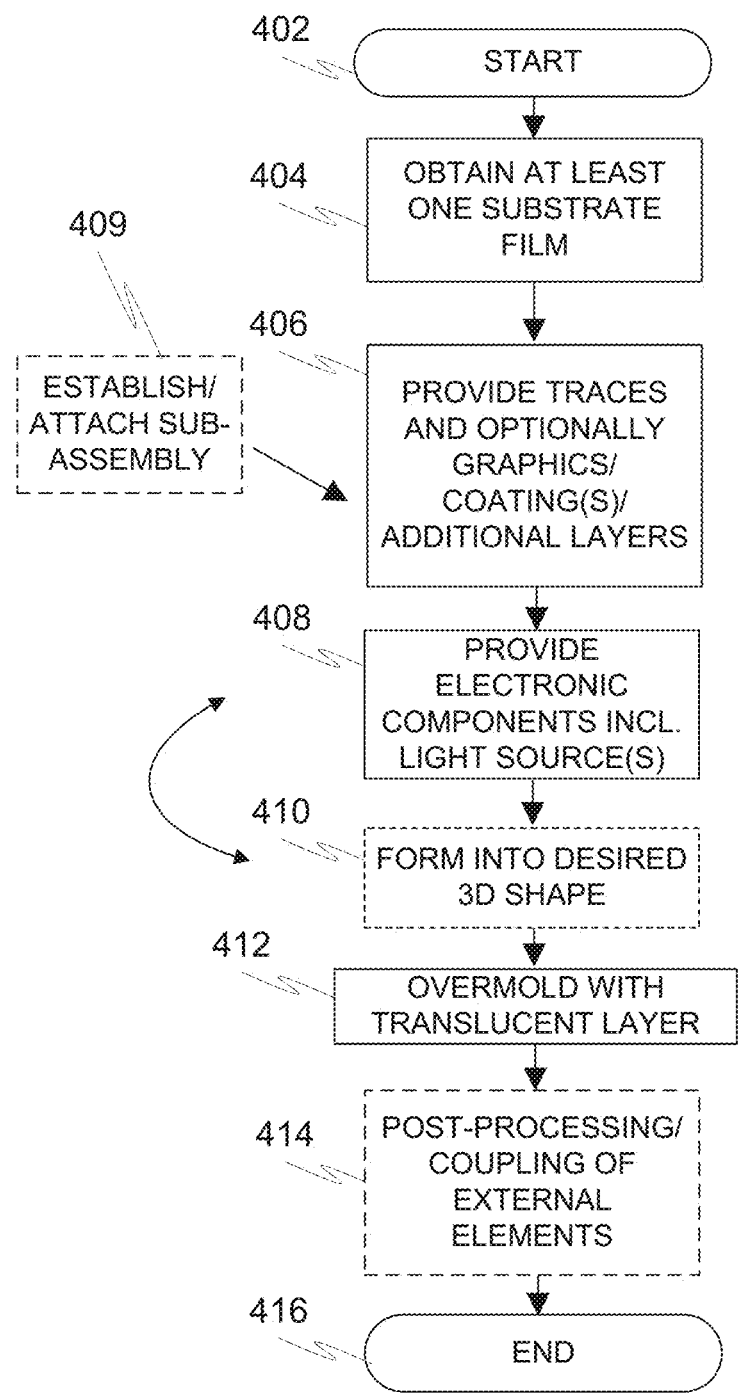
FIG. 4 is a flow diagram of an embodiment of a method in accordance with the present invention.

FIG. 4 shows, at 400, a flow diagram of an embodiment of a method in accordance with the present invention.

At the beginning of the method for manufacturing the multilayer structure, a start-up phase 402 may be executed. During start-up, the necessary tasks such as material, component and tools selection, acquisition, calibration and other configuration tasks may take place. Specific care must be taken that the individual elements and material selections work together and survive the selected manufacturing and installation process, which is naturally preferably checked up-front on the basis of the manufacturing process specifications and component data sheets, or by investigating and testing the produced prototypes, for example. The used equipment such as molding, IMD (in-mold decoration), lamination, bonding, (thermo)forming, electronics assembly, cutting, drilling, printing and/or measurement such as desired optical masurements—providing equipment, among others, may be thus ramped up to operational status at this stage.

At 404, at least one, optionally flexible, substrate film of plastics or other material for accommodating e.g., electronics is obtained. The substrate film may initially be substantially planar or e.g. curved. The substrate film may at least dominantly be of electrically substantially insulating material(s). A ready-made element, e.g. a roll or sheet of plastic film, may be acquired for use as the substrate material. In some embodiments the substrate film itself may be first produced in-house by molding using a mold or molding device or other methods from selected starting material(s). Optionally, the substrate film may be processed further at this stage. It may be, for example, provided with holes, notches, recesses, cuts, etc.

At 406, a number of electrically conductive elements defining e.g. conductor lines (traces), sensing elements such as electrodes, and/or contact areas such as pads to construct a circuit design are provided on the substrate film(s), either or both sides thereof, preferably by one or more additive techniques of printed electronics technology. For example, screen, inkjet, flexographic, gravure or offset lithographic printing may be applied by suitable printing device or devices. In some cases, also subtractive or semi-additive processes may be utilized. Further actions cultivating the film(s) involving e.g. printing or generally provision of graphics, visual indicators, thermal conductors, optical elements, etc. thereon may take place here.

In various embodiments the electrically conductive elements may include at least one material selected from the group consisting of: conductive ink, conductive nanoparticle ink, copper, steel, iron, tin, aluminium, silver, gold, platinum, conductive adhesive, carbon fibre, alloy, silver alloy, zinc, brass, titanium, solder, and any component thereof. The used conductive materials may be optically opaque, translucent and/or transparent at desired wavelengths, such as at least portion of visible light, so as to mask or let the radiation such as visible light to be reflected therefrom, absorbed therein or let through, for instance. This aspect has also been discussed elsewhere herein.

At 408 further circuitry such as one or more typically ready-made components including electronic components such as various SMDs may be attached to the contact areas on the film(s) e.g. by solder and/or adhesives. For example, light source(s) (e.g. LEDs) of selected technology and packaging may be provided here as well as e.g. different elements of control electronics, communication, sensing, connecting (e.g. connectors), hosting (circuit board(s), carrier(s), etc.) and/or power provision (e.g. battery) depending on the embodiment. A suitable pick-and-place or other mounting device may be utilized for the purpose, for instance. Alternatively or additionally, printed electronics technology may be applied to actually manufacture at least part of the components, such as OLEDs, directly onto the film(s). Accordingly, the execution of items 406, 408 to provide the multilayer structure with desired circuitry may temporally overlap as being understood by a skilled person. Yet, the components installed may include various optical elements such as lenses, reflectors, diffusers, masks, filters, etc., or e.g., a carrier element with optionally tilted surface for accommodating circuitry and/or a circuit board for the same.

Selected provided elements may be subjected to further processing such as encapsulation.

For the sake of completeness and having regard to the provision of circuitry and components to the structure, item 409 refers to possible attachment of one or more modules or other sub-systems or 'sub-assemblies' that may incorporate an initially separate, secondary substrate such as a circuit board provided with electronics such as light source(s), IC(s) and/or various components as being also contemplated hereinelsewhere. At least part of the electronics and/or other elements of the multilayer structure may be provided to the substrate film(s) via such module or sub-assembly. Optionally, the module or sub-assembly may be at least partially overmolded by a protective plastic layer prior to attachment to the main substrate. For example, adhesive, pressure and/or heat may be used for mechanical bonding of the module sub-assembly with the primary (host) substrate. Solder, wiring and conductive ink are examples of applicable options for providing the electrical connections between the elements of the module or sub-assembly and with the remaining electrical elements on the main substrate. Item 409 could also be executed e.g. upon item 408. The shown position thereof is primarily exemplary only.

In some embodiments, prior to or upon the molding phase 412, the substrate film(s) preferably already containing e.g. at least part of the circuit design, such as (printed) conductive elements and further elements such as electronic components, optical elements and/or modules or sub-assemblies, may be (3D) shaped, or "formed", 410 using thermoforming or cold forming, for instance, to exhibit a desired shape such as at least locally a three-dimensional (essentially nonplanar) shape. Applicable former device such as a thermoformer may be naturally utilized for the purpose. A bidirectional curved arrow has been illustrated in the figure to highlight the fact that shaping 410 could alternatively or additionally take place e.g. upon item 408, between items 406 and 408, or even upon or prior to item 406. Additionally or alternatively, at least some forming could take place after molding in case the already-established multilayer stack is designed to survive such processing.

Advantageously, the circuitry is at least partially, if not fully, provided on the film 102 and optionally film 120 prior to the afore-explained 3D-shaping of the film(s), i.e., when the film(s) were still essentially planar or at least more planar, to avoid subsequent tedious and more unreliable 3D-assembly of electronics on already 3D-shaped carriers.

At 412, at least one plastic layer, preferably a thermoplastic or thermoset layer, to act e.g., as a lightguide is produced, preferably molded such as injection molded, upon the substrate(s) so as to preferably at least partially embed the circuitry and further components, elements, or even modules/sub-assemblies of the multilayer structure. Desired portions may be left clear or cleared afterwards with mechanical or chemical processing, considering e.g., a cover portion of a module to host eg. replaceable elements as discussed hereinelsewhere. The molded material(s) may be provided using several molding steps or shots, or via a single step, wherein molded material may even optionally flow through a film from one side thereof to the opposing side via a hole prepared therein or by penetrating through the substrate material itself (e.g. through a thinned/thinner portion), for example. The molding material(s) may be e.g., electrically substantially insulating. As contemplated herein, the material is also advantageously translucent to act as a suitably lossy or attenuating lightguide.

In practice, at least one substrate film already provided with a number of further features such as at least part of the circuitry and potentially a number of various optical elements or modules, for instance, may be used as an insert in an injection molding process applying at least one molding machine. In case two films are used, both of them may be inserted in their own mold halves so that the plastic layer is injected at least between them. Alternatively, the second film could be attached to an already established aggregate of the first film and plastic layer afterwards by suitable lamination technique utilizing e.g., adhesive in between.

Regarding the resulting overall thickness of the obtained stacked multilayer structure, it depends e.g. on the used materials and related minimum material thicknesses providing the necessary strength in view of the manufacturing and subsequent use. These aspects have to be considered on case-by-case basis. For example, the overall thickness of the structure could be in the order of magnitude of about some millimetres as discussed hereinelsewhere, but considerably thicker or thinner embodiments are also feasible.

Item 414 refers to possible additional tasks such as post-processing and installation tasks. Further layers or generally features, may be added into the multilayer structure by molding, lamination or suitable coating (e.g. deposition) procedure not forgetting other possible positioning or fixing techniques. The layers may be of protective, indicative and/or aesthetic value (graphics, colors, figures, text, numeric data, etc.) and contain e.g. textile, leather or rubber materials instead of or in addition to (further) plastics. Additional elements such as electronics, modules, module internals or parts, and/or optics may be installed and fixed e.g. at the outer surface(s) of the structure, such as the exterior surface of an included film or a molded layer depending on the embodiment. Necessary material shaping/cutting may take place. For example, a diffuser may be produced from locally lasering lightguide material as contemplated hereinelsewhere. If provided with a connector, the connector of the multilayer structure may be connected to a desired external connecting element such as an external connector of an external device, system or structure, e.g. a host device. For example, these two connectors may together form a plug-and-socket type connection and interface. The multilayer structure may also be generally positioned and attached herein to a larger ensemble such as an electronic host device, optionally a personal communications device, computer, household apparatus, industrial device, or e.g. a vehicle in embodiments wherein the multilayer structure establishes a part of vehicle exterior or interior, such as a dashboard.

At 416, method execution is ended.

Figure 5:
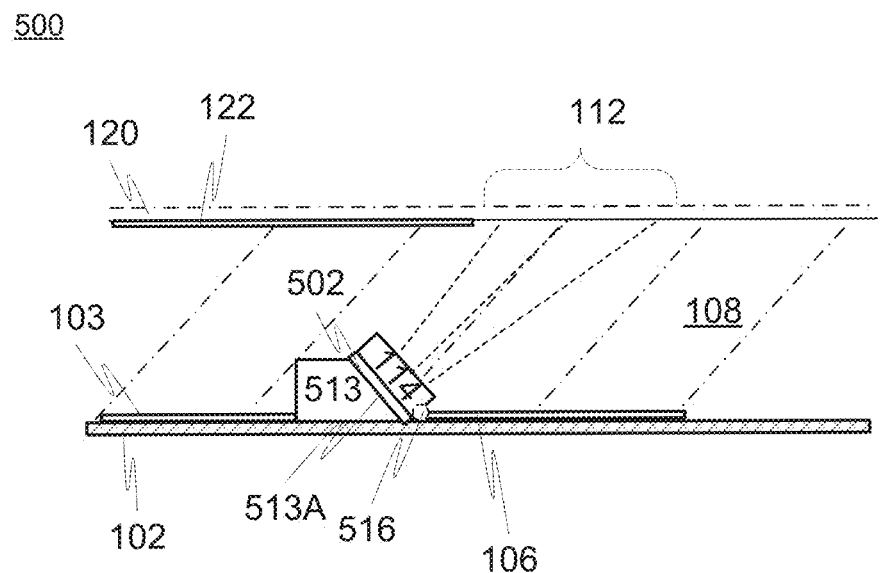
FIG. 5 illustrates one more embodiment of the multilayer structure, different features of which, such as provision of a tilted carrier element for a light source, could be at least selectively utilized in addition to or instead of any of the ones of the other embodiments contemplated herein for carrying out the invention.

FIG. 5 illustrates, at 500, a tilted carrier element 513 for a light source, which could be at least selectively utilized in addition to or instead of any of the features of the embodiments of preceding Figs in carrying out the present invention. Indeed, instead of or in addition to 3D shaping the underlying substrate film as was done in FIG. 2, a tilted, optionally beveled, surface 513A relative to the plane of the underlying substrate film and/or surface 108A, for hosting at least the first light source 104 could be provided e.g., by an element 513 arranged on the substrate film 102 to cleverly orientate the light source 104 and e.g. its emission direction(s), or sensing direction(s) in the case of a sensor type circuitry provided on the element 513, as desired and also previously discussed.

The element 513 may comprise plastic material such as thermoplastics, metal, ceramics, etc. It 513 may be (injection) molded or 3D printed, for example. Yet, it 513 may be manufactured for different tilting angles depending on the use case. The material may be at least locally thermally conductive for improved heat dissipation. Electrical conductivity could be provided at least in places for enabling electrical connectivity on and/or through it.

When hosting light sources, the tilted surface 513A may improve the size and uniformity of the obtained, more remote illumination area, while it may be also used for hosting sensors or various actuators, whereupon those sensors' or actuators' effective area may be improved. Illuminated area/outcoupling area 112 on the surface 108A may be shifted horizontally or laterally, e.g. from the area directly above the light source 104 in connection with top-emitting sources, or brought closer in connection with a side-shooting source, for example. Similar beneficial effects could be obtained by the 3D shaped substrate film 102 discussed in connection with FIG. 2 as well.

The element 513 may contain flat side(s) and/or top for convenient assembly (e.g. pick and place surface mounting process) and/or for hosting additional elements, e.g. printed or attached electrode (e.g., for capacitive or other touch/gesture sensing) or other electronic elements or components. It may be beneficial e.g., for sensing purposes to utilize the top surface of the element 513 as it is closer to the environment of the structure upon surface 108A.

In some embodiments, a circuit board 502 for accommodating at least part of the circuitry such as the first light source 114 and e.g. traces or other circuitry 106, could be provided as integrated, optionally even monolithic, or separate from the tilting element 513 defining the surface 513A. The circuit board 502 may in some embodiments be adopted also in isolation without the element 513 and related tilted surface 513A as well.

The circuit board 502 may comprise at least one element selected from the group consisting of: a flexible film or sheet, a rigid sheet, rectangular sheet or film, rounded or essentially circular sheet or film, a FR4 based circuit board, flame retardant circuit board, metal core circuit board, plastic substrate, molded such as injection molded plastic substrate, metal substrate such as sheet metal substrate optionally having an electrically insulated layer at least selectively provided thereon, or a ceramic circuit board.

The circuitry 106, 114 on the circuit board 502 may be configured to electrically and preferably thermally connect to a number of locations of the remaining multilayer structure beside or underneath the circuit board, utilizing at least one connection material 516 positioned in between, preferably at least at the periphery of the circuit board 502 (if present). Electrically and/or thermally conductive solder, ink or adhesive may be used for the purpose, for example.

Use of the circuit board 502 may facilitate thermal management in connection with high power light sources such as high power LEDs, for example. Damaging the substrate film 102 by excessive heat build-up by the electronics may be then avoided among other benefits; the circuit board 502 could act as a heat sink. Yet, the use of the circuit board 502 may facilitate electronics assembly and provision thereof e.g. on the surface 513A, for which purpose mechanical attachment features (e.g. a compatible fixing features such as a protrusion and matching recess or hole on the surface 513A and board 502, respectively) and/or adhesive may be utilized.

Figure 6:
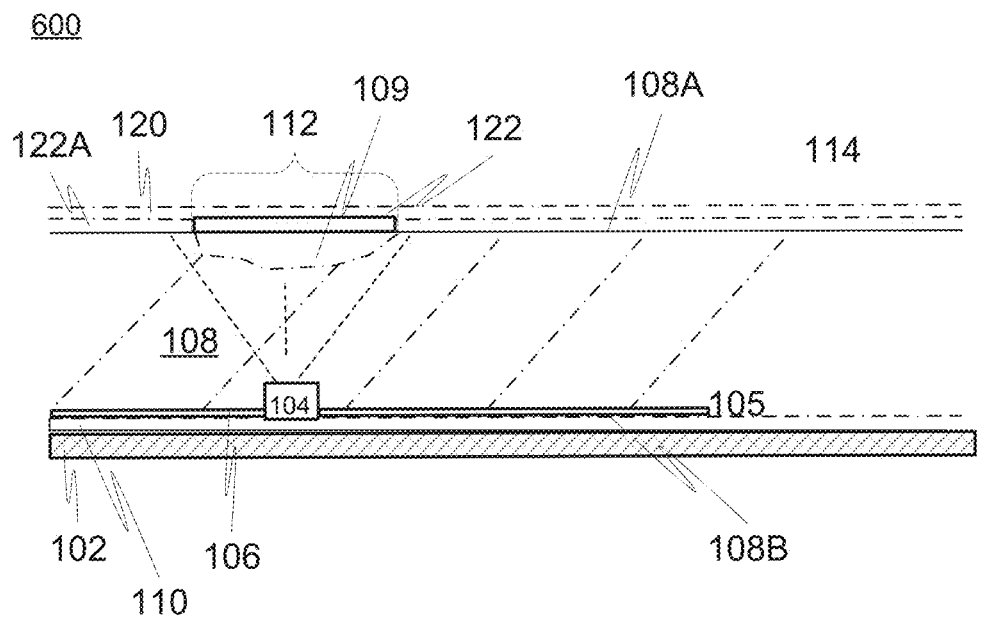
FIG. 6 illustrates one more embodiment of the multilayer structure, different features of which, such as a diffuser, could be at least selectively utilized in addition to or instead of any of the ones of the other embodiments contemplated herein for carrying out the invention.

FIG. 6 illustrates, at 600, an embodiment of a diffuser included in any multilayer structure discussed herein. Item 122 generally indicative of a functional element may herein particularly refer to a print such as an icon to be illuminated and potentially covering all or most of the outcoupling area 112, whereas item 122A may refer to a surrounding or at least adjacent opaque print, coating or film blocking the light, for instance. A further film 120 may be additionally or alternatively provided on top for protection and/or other uses such as for implementing a further optical function. The film 120 may be clear/substantially transparent or e.g., colored with specular or diffuse transmission properties regarding the transmitted wavelengths.

Accordingly, a diffuser 109 preferably of varying thickness is provided and located on the optical path extending from a light source 104, 105 to the environment of the structure via the outcoupling area 112 of the concerned light source 104, 105. The diffuser 109 may be optionally monolithic with the lightguide layer 108 and the translucent material of the lightguide layer 108. Still, it 109 may be additively produced on the lightguide layer, and/or subtractively produced from e.g., a layer 120, 120b, 122 upon the lightguide layer 108. Inclusion of a ready-made diffuser 109 component in the structure is a further option, optionally provided in connection with or integral with a larger module comprising e.g. a light source, a carrier element, a circuit board and/or a related wall structure. These different options may also be selectively combined by a person skilled in the art to come up with a desired diffuser 109. Optionally, the diffuser 109 may include or be adjacent an air cap or cavity filled with some other material such as diffusive material.

The diffuser 109 may enhance illumination performance of the structure, such as illumination uniformity on the outcoupling area 112. The diffuser 109 may thus prevent e.g. hot spots or dark spots occurring.

The diffuser 109 may be manufactured from e.g. diffusive plastic by (injection) molding, 3D printing or other additive method, or by CNC milling or lasering, for instance. Using e.g., laser, the transparency and translucency of the lightguide layer 108 may be locally modified to implement the diffuser 109 therefrom. On the other hand, the diffuser 109 may be constructed from several printed stacked layers. Filtering characteristics of diffusive layer(s), which may optionally mutually differ, of the diffuser 109 may be utilized to block e.g. selected colors. White, whitish or a single-color exhibiting diffuser 109 if just not an essentially clear or at least non-color diffuser 109 could be used as a default solution for general applications, whereas a multi-color option may turn out useful e.g. in area diffusers 109 with different areas associated with certain colors. Light blocks or black areas may be further integrated with and implemented in the diffusers 109. Therefore, the diffuser 109 may also be used to block light from entering undesired areas e.g. on the surface 108A, which may reduce a need for additional blocking (opaque) prints.

Figure 7:
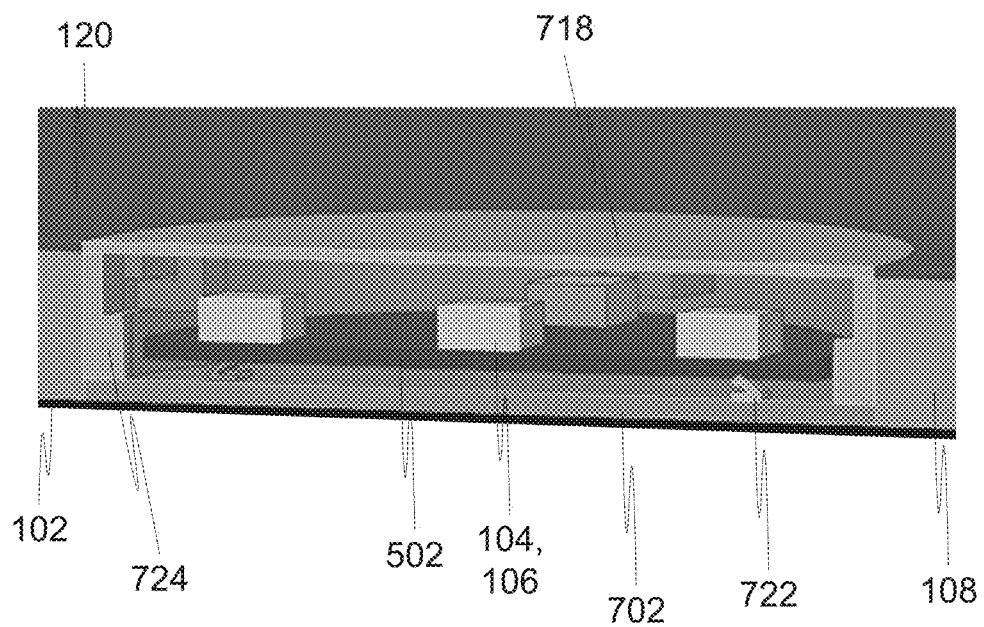
FIG. 7 illustrates an embodiment of at least partially replaceable and/or post-installation accessible module containing one or more of the light sources and/or other circuitry, which could be utilized in connection with various embodiments of the present invention.

FIG. 7 illustrates, at 700, an embodiment of least partially replaceable or post installation-accessible module containing e.g., one or more of the light sources 104, 105 and/or other circuitry generally included in the multilayer structure discussed herein.

Adjacent the translucent material of the lightguide layer 108, is advantageously provided a module having a wall structure 724 at least laterally substantially surrounding and preferably also contacting an optionally spring-loaded (see spring element 722) circuit board 502 optionally of characteristics already discussed hereinbefore relative to FIG. 5, hosting a light source 104, 105 and optionally further circuitry 106 such as traces, control electronics etc. Yet, a replaceable power source such as a rechargeable or disposable battery could be provided in the module for enabling easy access thereto.

Advantageously, the board 502, the light source(s) 104, 105 thereon, and/or further elements included (e.g. radiation/light detectors, battery, processing unit, memory, data interface device, contact or specifically programming pads, pins, traces, etc.) are accessible and one or both of them further preferably replaceable externally from the environment of the structure e.g., via a movable, optionally e.g. hinged or fully removable, cover 718 of the module provided on the first 108A and/or second 108B surface. Surface layer(s) 108A, 108B may indeed contain opening for providing easy access to the embedded module. Item 702 refers to a base layer of the module providing e.g., support to the wall structure 724 and/or board 502. In some embodiments, the base 702 may be omitted.

The cover 718 may comprise e.g. mechanical, externally operable fastening features such as wedge-shaped springy protrusions with compatible counterparts such as recesses or holes at the walls 724, or vice versa. Alternatively or additionally e.g. screws may be utilized for maintaining the module intact and protected by the cover 718 upon use while still enabling convenient service actions whenever needed.

In some embodiments, the cover 718 may be configured as an optical element such as a lens, such as a collimating, diffusive, or e.g. Fresnel or other specific lens, for the elements, e.g. light sources or light/radiation detectors, included in the module.

In some embodiments, a number of elements provided in the module, such as any of the previously contemplated options, may be installed in sockets for easier assembly or replacement after manufacturing, for example. The socket(s) may be provided on the board 502.

Figure 8:
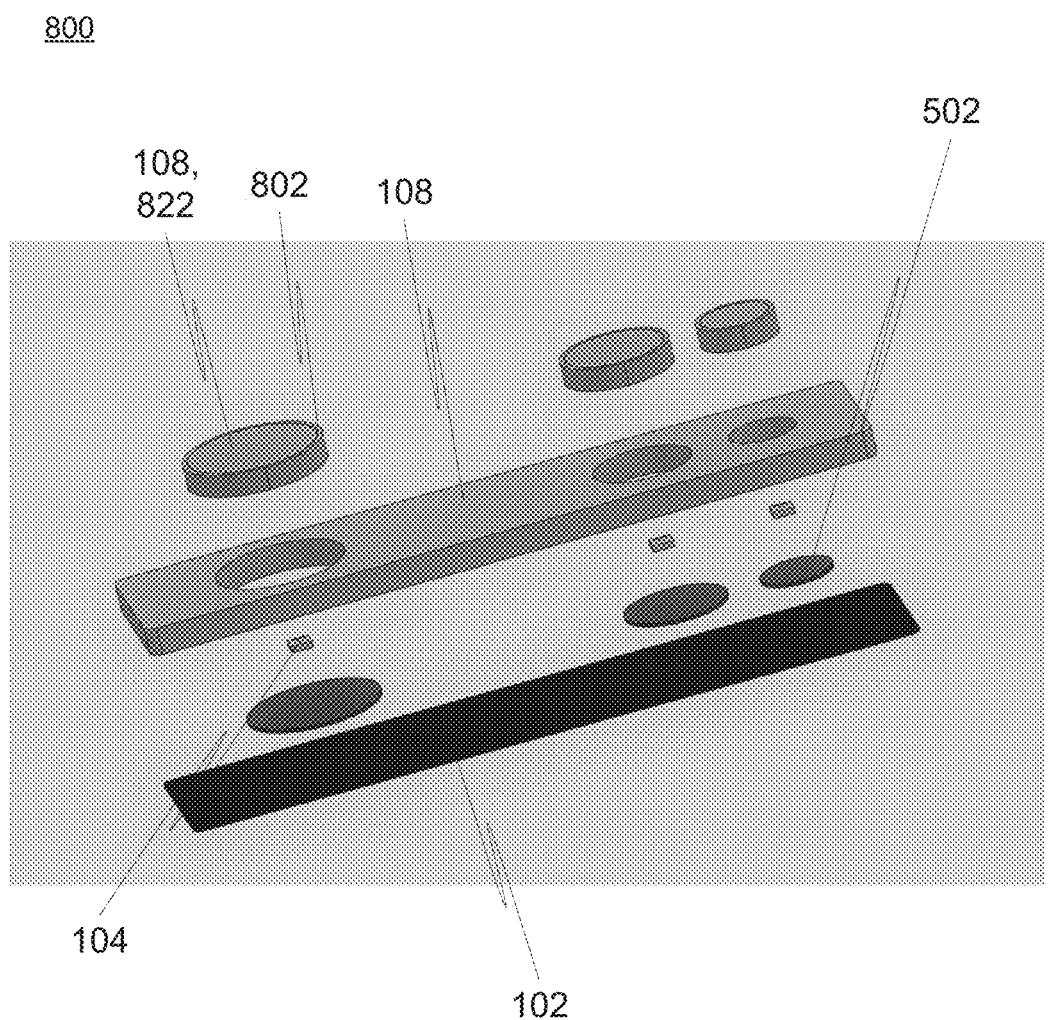
FIG. 8 illustrates one more embodiment of the multilayer structure, different features of which, such as a reflector or a preferably rigid circuit board for circuitry preferably including at least one light source, could be at least selectively utilized in addition to or instead of any of the ones of the other embodiments contemplated herein for carrying out the invention.

FIG. 8 illustrates, at 800, via an exploded view selected details of an embodiment wherein at least one light source 104, 105 is at least partially surrounded by an optionally cylindrical optical reflector structure 802 preferably extending in the thickness direction of the lightguide layer 108. The internals of the reflector structure 802 may comprise diffusive translucent resin 822 that is optionally, however, different from the translucent material of the lightguide layer 108.

As being clear also based on the figure, circuitry such as light source 104 may be provided on a circuit board 502 already discussed in more detail relative to FIG. 5 and related text.

Yet, in some embodiments, the reflector 802 could be integrated with, connected to, or at least implemented together with the wall structure 724 of the solution of FIG. 7. Also other features of the module and the overall solution in general could be adopted from FIG. 7 to the reflector context.

Figure 9:
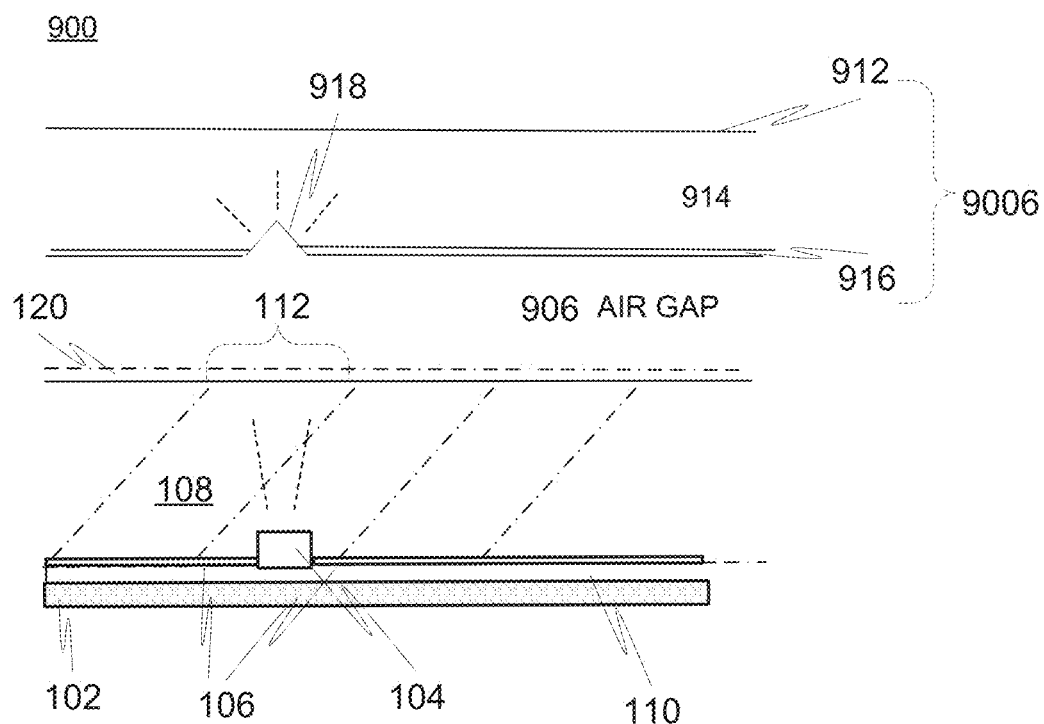
FIG. 9 illustrates one more embodiment of the multilayer structure, different features of which, such as an air gap, could be at least selectively utilized in addition to or instead of any of the ones of the other embodiments contemplated herein for carrying out the invention.
Figure 10:
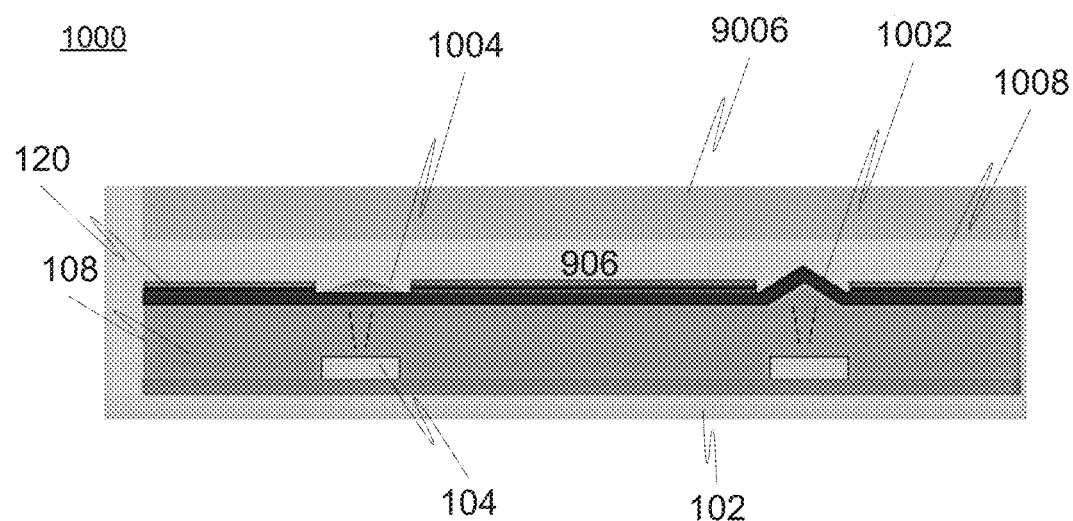
FIG. 10 illustrates one more embodiment of the multilayer structure, different features of which, such as a 3D shaped film or other 3D shaped (i.e., not merely essentially planar) material layer having an optical function, could be at least selectively utilized in addition to or instead of any of the ones of the other embodiments contemplated herein for carrying out the invention.

FIGS. 9 and 10 illustrate at 900 and 1000, respectively, further features, such as an air gap and/or optically functional shapes, which could be at least selectively utilized in the constructed multilayer structure in addition to or instead of any of the ones of the other embodiments contemplated herein for carrying out the invention.

In FIG. 9, an embodiment of a multilayer structure discussed hereinbefore is provided with a frontal material stack or layer 9006 of a preferably plastic top film 912, optionally plastic or glass lightguide layer 914 e.g. of essentially polycarbonate or TPU resin, and/or optionally indicative or decorative film/layer 916 optionally having limited optical transmission (e.g. about 30%, 20% or 10% or less).

Optically functional shape(s) 918 (graphical and/or 3D shapes such as a number of icons, symbols, patterns, alphanumeric characters, etc.) may be established e.g., in the lightguide layer 914 and/or film/layer 916 to produce a desired illumination effect from the light (see the two broken lines having an end point at the light source 104) emitted by underlying light source(s) 104, 105, such as top-shooting LEDs, of the multilayer structure. 3D shaping methods optionally including thermoforming or surface processing (e.g. embossing, milling, etc.) may be used for the purpose in addition to or instead of molding. Film 120 is optional but it may be used e.g., for optical balancing or other optical functions.

In FIG. 10, the film 120 is configured to carry e.g. printed (preferably screen printed or otherwise additively produced) optically functional 3D shape 1004 and/or directly define the shape 1002 due to local 3D shape/shaping of the film itself 120 (or at least its surface), obtained by thermoforming or other applicable 3D shaping method. 3D shape may be additionally or alternatively achieved during injection molding of the film 120 or of material provided thereon. Item 9006 refers to a number of frontal layers or a related material stack preferably including a transparent or translucent layer at least in places to enable the light emitted by the source(s) 104, 105 positioned below to propagate through towards the environment. Item 1008 refers to a light block layer such as a film or a printed layer.

The optical functions considered above relative to FIGS. 9 and 10 may vary and be selected case-specifically but include e.g. optical transmission, masking, filtering, scattering, collimation, etc. depending on the requirements set by use scenarios.

The solutions of FIGS. 9 and 10 may be also selectively combined besides mutually, also with any of embodiments previously discussed herein.

The scope of the present invention is determined by the attached claims together with the equivalents thereof. A person skilled in the art will appreciate the fact that the disclosed embodiments were constructed for illustrative purposes only, and other arrangements applying many of the above principles could be readily prepared to best suit each potential use scenario.

The invention claimed is:

1. An integrated functional multilayer structure, comprising:
    a flexible substrate film,
    circuitry provided upon the substrate film, said circuitry comprising a first light source containing at least one light-emission unit, and
    a monolithic lightguide layer molded upon the substrate film so as to cover and optically couple to the first light source, the lightguide layer comprising optically attenuating, translucent material,
    wherein the lightguide layer comprises a first surface and an opposite second surface, the second surface facing the first light source and a portion of the first surface containing, within a first distance (H) from the first light source, a pre-defined outcoupling area for the light emitted by the first light source and transmitted within the lightguide layer, said lightguide layer further containing a light leakage prohibition region non-overlapping with the outcoupling area and separated from the first light source by at least a second distance (D), and the attenuation of emitted light effectuated on a direct optical path between the first light source and the outcoupling area is less than the attenuation effectuating on a shortest optical path between the first light source and the light leakage prohibition region, and further wherein the optical transmittance of the translucent material of the lightguide layer is between about 25% and about 80% at selected wavelengths of about 2 mm thick sample of the translucent material while the associated half power angle is between about 5 and about 70 degrees.

2. The structure of claim 1, wherein said first light source has direct lines of sight (LOS) free of light blocking elements both with the outcoupling area and the light leakage prohibition region.

3. The structure of claim 1, wherein a light depletion distance (DD) from the first light source indicative of dominant intensity loss of the emitted light at selected wavelengths of light emitted by the first light source while propagating in the translucent material, is between the first (H) and second (D) distances.

4. The structure of claim 1, wherein the light leakage prohibition region comprises a portion of the first surface of the lightguide layer.

5. The structure of claim 1, wherein the light leakage prohibition region defines a selected sub-volume of the lightguide layer optionally extending through the lightguide layer in a direction spanning the first and second surfaces.

6. The structure of claim 1, wherein:
the light leakage prohibition region defining a portion of the first surface of the lightguide layer exhibits luminance uniformity of at least 50% responsive to the light of the first light source outcoupled therethrough; and/or
the outcoupling area exhibits luminance uniformity of at least about 70% responsive to the light of the first light source outcoupled therethrough.

7. The structure of claim 1, wherein the light leakage prohibition region defines a portion of the first surface of the lightguide layer and the intensity of light of the first light source outcoupled via the light leakage prohibition region via said portion of the first surface of the lightguide layer is dominantly less than of the light emitted by the first light source at selected wavelengths and outcoupled via the outcoupling area.

8. The structure of claim 1, wherein the second distance (D) is about 1.2, 1.5, 2, 3, 4 or 5 times greater than the first distance (H).

9. The structure of claim 1, wherein the at least first light source comprises:
top-emitting, side-emitting, dual side emitting, or bottom emitting and optionally flip-chip type light-emission unit;
multiple light-emission units packaged or at least grouped together; and/or
a multicolor or specifically RGB LED of several LED emitters provided within a single package.

10. The structure of claim 1, wherein at least the first light source is associated with at least one further outcoupling area, the first and further outcoupling areas optionally having a light blocking element at least partially in between.

11. The structure of claim 1, wherein the shortest distance between the first light source and the outcoupling area is equal or less than the first distance (H), and less than about 20 mm.

12. The structure of claim 1, wherein the thickness of the lightguide layer of translucent material is about 10 mm or less.

13. The structure of claim 1, wherein the translucent material comprises at least one of plastic resin or thermoplastic resin.

14. The structure of claim 1, wherein the translucent material is colored.

15. The structure of claim 14, wherein the let-down ratio is between about 1%-5%, or less.

16. The structure of claim 1, further comprising a tilted surface relative to the plane of the underlying substrate film, for hosting at least the first light source.

17. The structure of claim 1, further comprising a diffuser of varying thickness on the optical path extending from the first light source to the environment of the structure via the outcoupling area, wherein the diffuser is monolithic with the lightguide layer and the translucent material of the lightguide layer, additively produced on the lightguide layer, and/or subtractively produced from a layer upon the lightguide layer.

18. The structure of claim 1, further comprising, adjacent the translucent material of the lightguide layer, a module having a wall structure at least laterally substantially surrounding a circuit board, hosting at least the first light source, wherein the circuit board and the first light source are accessible and one or both of them preferably replaceable externally from the environment of the structure via a cover on the first or second surface.

19. The structure of claim 1, further comprising an optical reflector wall structure laterally surrounding at least the first light source and extending in the thickness direction of the lightguide layer at least partially embedding the reflector wall structure.

20. The structure of claim 1, further comprising, upon the lightguide layer, a stack of an air gap or air cavity and/or ensemble of one or more layers, wherein at least a film advantageously contains an optically functional 3D shape additively produced from opaque or translucent material or locally shaped, from the concerned film.

21. The structure of claim 1, further comprising at least one, attached and/or additively in-situ produced functional element on the first surface of the lightguide layer, selected from the group consisting of a conductive trace, electrode, electrical insulator, electronic component, circuit element, connector, light blocking element, graphical element, optical diffuser, reflector, dispersive element, and/or collimator.

22. The structure of claim 1, further comprising at least one, attached and/or addivitely in-situ produced such as printed, film or coating on the first side of the lightguide layer, and defining an opaque or translucent light masking or filtering element and/or at least part of a graphical element to be illuminated by the first light source or a further light source included.

23. The structure of claim 1, wherein the substrate film contains a 3D-formed portion hosting the first light source thereon in a tilted orientation relative to first surface.

24. The structure of claim 1, wherein the circuitry further comprises at least one element selected from the group consisting of a number of electrically conductive traces connecting at least to the first light source, electronic component, integrated circuit, electrode, contact pad, and/or an electrical connector.

25. The structure of claim 1, wherein the substrate film and/or further film or material layer included comprises at least one material selected from the group consisting of polymer, thermoplastic material, electrically insulating material, PMMA (Polymethyl methacrylate), Poly Carbonate (PC), copolyester, copolyester resin, polyimide, a copolymer of Methyl Methacrylate and Styrene (MS resin), glass, Polyethylene Terephthalate (PET), carbon fiber, organic material, biomaterial, leather, wood, textile, fabric, metal, organic natural material, solid wood, veneer, plywood, bark, tree bark, birch bark, cork, natural leather, natural textile or fabric material, naturally grown material, cotton, wool, linen, silk, and any combination thereof.

26. The structure of claim 1, wherein the lightguide layer, specifically the translucent material thereof, and/or a further fill layer included in the structure comprises at least one material selected from the group consisting of polymer, organic material, biomaterial, composite material, thermoplastic material, thermosetting material, elastomeric resin, PC, PMMA, ABS, PET, copolyester, copolyester resin, nylon (PA, polyamide), PP (polypropylene), TPU (thermoplastic polyurethane), polystyrene (GPPS), TPSiV (thermoplastic silicone vulcanizate), and MS resin.

27. A method for manufacturing an integrated functional multilayer structure, comprising:
    obtaining a flexible substrate film preferably comprising formable material;
    providing circuitry upon the substrate film, said circuitry comprising a first light source containing at least one light-emission unit;
    producing a monolithic lightguide layer of optically attenuating, translucent material, upon the substrate film to cover, optically couple to the first light source;
    wherein the lightguide layer and the first light source are mutually configured so that the lightguide layer comprises a first surface and an opposite second surface, the second surface facing the first light source and a portion of the first surface containing, within a first distance (H) from the first light source, a pre-defined outcoupling area for the light emitted by the first light source and transmitted within the lightguide layer, said lightguide layer further comprising a light leakage prohibition region non-overlapping with the outcoupling area and separated from the first light source by at least a second, preferably greater, distance (D), and that the attenuation of emitted light effectuated on a direct optical path between the first light source and the outcoupling area is less than the attenuation effectuating on a shortest optical path between the first light source and the light leakage prohibition region, and further wherein
    the optical transmittance of the translucent material of the lightguide layer is between about 25% and about 80% at selected wavelengths of about 2 mm thick sample of the translucent material while the associated half power angle is between about 5 and about 50 degrees.

28. The method of claim 27, wherein the substrate film is 3D-formed to exhibit at least locally a resulting 3D-shape.

29. The method of claim 27, wherein the translucent material is produced through blending at least pigment or masterbatch color additive with raw resin in a selected let-down ratio.

30. The method of claim 27, wherein the lightguide layer is produced upon the substrate film by injection molding.

* * * * *